United States Patent
Oga et al.

(10) Patent No.: US 9,522,638 B2
(45) Date of Patent: Dec. 20, 2016

(54) WIRE HARNESS WITH FIXING MEMBERS

(71) Applicant: Yazaki Corporation, Minato-ku, Tokyo (JP)

(72) Inventors: Tatsuya Oga, Kosai (JP); Hiroyuki Yoshida, Kosai (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 21 days.

(21) Appl. No.: 14/404,035

(22) PCT Filed: May 24, 2013

(86) PCT No.: PCT/JP2013/065119
§ 371 (c)(1),
(2) Date: Nov. 26, 2014

(87) PCT Pub. No.: WO2013/180251
PCT Pub. Date: Dec. 5, 2013

(65) Prior Publication Data
US 2015/0136479 A1    May 21, 2015

(30) Foreign Application Priority Data
May 29, 2012 (JP) .................... 2012-121505

(51) Int. Cl.
*B60R 16/02* (2006.01)
*H01B 1/02* (2006.01)

(52) U.S. Cl.
CPC ........... *B60R 16/0215* (2013.01); *H01B 1/023* (2013.01)

(58) Field of Classification Search
CPC .. B60R 16/0207; B60R 16/0215; H01B 1/023
(Continued)

(56) References Cited

U.S. PATENT DOCUMENTS 5,588,683 A    12/1996 Schliessner
6,229,091 B1 *  5/2001 Ogawa ................ B60R 16/0215
                                                            174/72 A
(Continued)

FOREIGN PATENT DOCUMENTS

EP        666628 A1    8/1995
EP       1548350 A1    6/2005
(Continued)

OTHER PUBLICATIONS

Sep. 17, 2013—International Search Report and Written Opinion—Intl App PCT/JP2013/065117—Eng Tran.
(Continued)

*Primary Examiner* — Timothy Thompson
*Assistant Examiner* — Michael F McAllister
(74) *Attorney, Agent, or Firm* — Banner & Witcoff, Ltd.

(57) ABSTRACT

A wire harness wiring structure includes a wire harness and three fixing members. A first fixing member, is provided at the wire harness, and is fixed to a vibration transmitting source. A second fixing member is provided at the wire harness, and is fixed to a vibration non-transmitting object. A third fixing member is provided at the wire harness between the first fixing member and the second fixing member, is fixed to a vibration non-transmitting object, and allows the wire harness to move in a predetermined movement range.

8 Claims, 7 Drawing Sheets

(58) Field of Classification Search
USPC .................................................. 174/72 A
See application file for complete search history.

(56) References Cited

U.S. PATENT DOCUMENTS

| | | | | |
|---|---|---|---|---|
| 6,717,055 | B2* | 4/2004 | Kato | H02G 3/32 |
| | | | | 173/136 |
| 6,752,426 | B2* | 6/2004 | Kacines | B60T 8/329 |
| | | | | 174/72 A |
| 7,219,931 | B2 | 5/2007 | Kato | |
| 7,485,808 | B2* | 2/2009 | Guthke | F16L 3/1091 |
| | | | | 138/120 |
| 8,291,551 | B2* | 10/2012 | Bruss | F16B 7/0433 |
| | | | | 138/108 |
| 8,410,365 | B2 | 4/2013 | Ogawa et al. | |
| 8,561,296 | B2 | 10/2013 | Oga et al. | |
| 8,624,114 | B2 | 1/2014 | Oga et al. | |
| 2005/0011687 | A1* | 1/2005 | Yamaguchi | B60K 6/48 |
| | | | | 180/65.1 |
| 2005/0139732 | A1 | 6/2005 | Kato | |
| 2009/0311899 | A1* | 12/2009 | Takehara | H01R 13/5213 |
| | | | | 439/292 |
| 2010/0043225 | A1 | 2/2010 | Oga et al. | |
| 2010/0045106 | A1 | 2/2010 | Oga et al. | |
| 2011/0061932 | A1* | 3/2011 | Ogawa | B60R 16/0207 |
| | | | | 174/72 A |

FOREIGN PATENT DOCUMENTS

| | | |
|---|---|---|
| EP | 2295295 A2 | 3/2011 |
| FR | 2778280 A1 | 11/1999 |
| JP | S53-154398 U | 12/1978 |
| JP | S61-113530 U | 7/1986 |
| JP | H07-310866 A | 11/1995 |
| JP | H08-85399 A | 4/1996 |
| JP | H09-178049 A | 7/1997 |
| JP | H09-294322 A | 11/1997 |
| JP | H11-11231 A | 1/1999 |
| JP | 2004-187440 A | 7/2004 |
| JP | 2008-253017 A | 10/2008 |
| JP | 2008-290472 A | 12/2008 |
| JP | 2010-047031 A | 3/2010 |
| JP | 2010-047032 A | 3/2010 |
| JP | 2011-060711 A | 3/2011 |

OTHER PUBLICATIONS

Nov. 24, 2015—(JP) Notification of Reasons for Refusal—App 2012-121505.

* cited by examiner

WIRE HARNESS WITH FIXING MEMBERS

TECHNICAL FIELD

The present invention is related to a wiring structure of a wire harness which receives vibrations.

BACKGROUND ART

An electric vehicle or a hybrid vehicle includes a motor unit which is a power source, an inverter unit which produces three-phase alternating current that is necessary to drive the motor unit, and a wire harness, namely, a motor cable, to connect the motor unit and the inverter unit. The above vehicle includes a wire harness connected to the inverter unit and a battery which supplies electric power via the wire harness.

For example, with respect to the motor cable, PTL 1 to be described below is cited as an example. A motor cable disclosed in the PTL 1 includes a cable body which includes a plurality of cables, a motor side connecting part which is provided at one end of the cable body and performs as a connecting part of the motor unit, an inverter side connecting part which is provided at the other end of the cable body and performs as a connecting part of the inverter unit, and a cable fixing member which is provided at a middle part of the cable body to fix the middle part to a vehicle body. The cable fixing member is fixed to the vehicle body by using an exclusive mounting table and fixing metal fittings.

On the other hand, with respect to the wire harness which connects the inverter unit and the battery, PTL 2 to be described below is cited as an example. The wire harness disclosed in the PTL 2 below includes a plurality of high voltage electric wires, an outer member which accommodates and protects the plurality of high voltage electric wires, a corrugated tube which covers the high voltage electric wires drawn out from the end of the outer member, a cable fixing member which is provided at a middle part of the corrugated tube and fixes the middle part to the vehicle body, an inverter side connecting part and a battery side connecting part.

CITATION LIST

Patent Literature

[PTL 1] JP-A-2008-253017
[PTL 2] JP-A-2010-047032

SUMMARY OF INVENTION

Technical Problem

Figure 7:
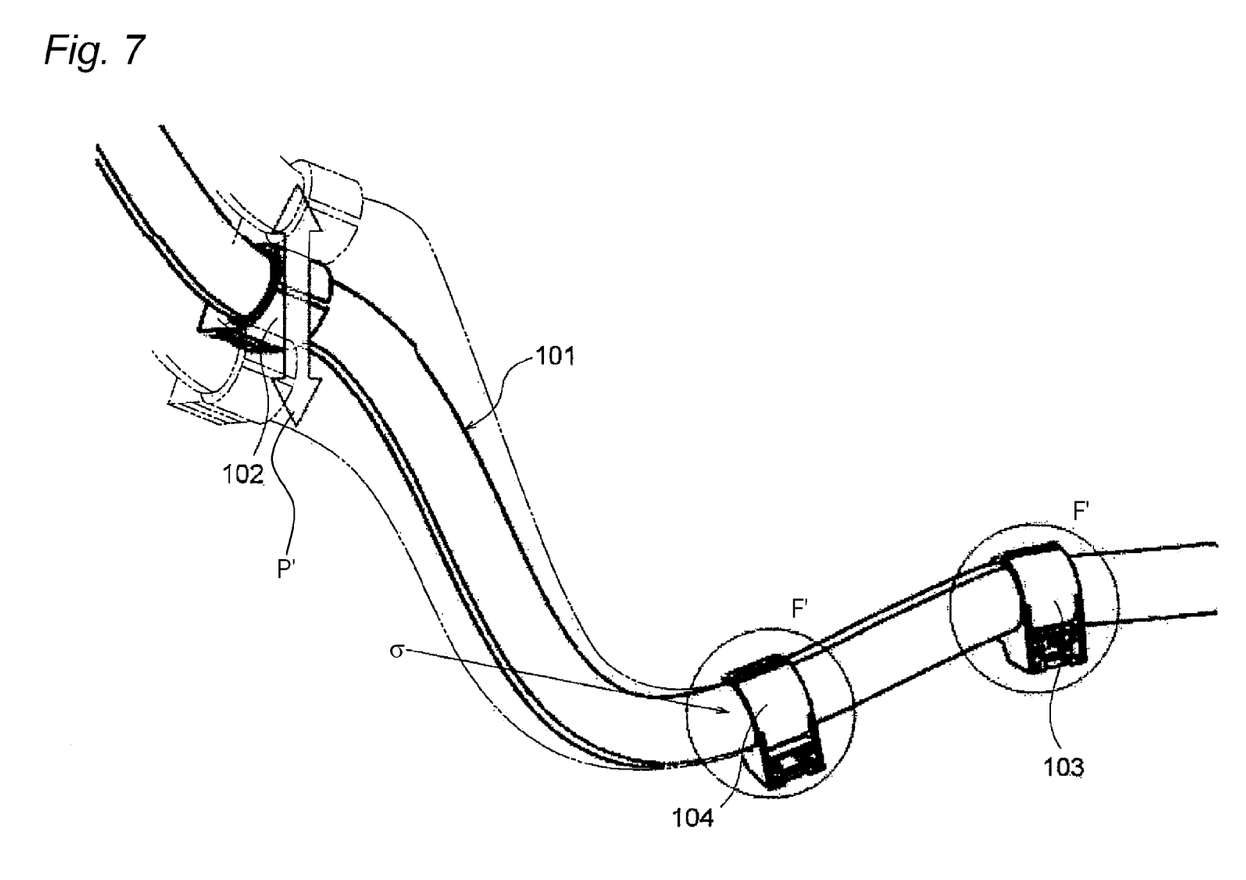
FIG. 7 is a perspective view of a wire harness wiring structure of the related art.

In FIG. 7, a wire harness 101 is fixed to a vibration transmitting source not shown in the figure through a cable fixing member 102. A vibration from the vibration transmitting source is shown as an arrow P'. The wire harness 101 is fixed to a panel member of the vehicle body not shown in the figure through cable fixing members 103 and 104. Fixing portions are shown as areas surrounded by circles F'. The panel member itself does not positively transmit vibrations. That is, the panel member is a vibration non-transmitting source. The wire harness 101 vibrates while the vibration transmitting source vibrates.

If the wire harness 101 is wired in this way, when there is a concern of break by stress concentration due to the vibration at the position of the cable fixing member 104 as indicated by an arrow σ, valuations are performed, and measures such as the adjustment of the course length of the wire harness 101, the adjustment, for example, of the direction of the cable fixing member 104, and a change of the type of the cable fixing member 104 are taken.

Therefore, there are problems that when the above measures are necessary at a stage that the arrangements of peripheral units are fixed, it becomes difficult to arrange the wire harness 101, special cable fixing members have to be used, and the cost in these measures is increased.

Besides the above problems, it may be mentioned that it is difficult to use aluminum electric wires which have low flexibility resistance. The aluminum electric wires are conductive paths which are effective in reducing the cost and the weight.

It is therefore one advantageous aspect of the present invention to provide a wire harness wiring structure which makes it possible to prevent break of the wire harness and reduce the cost.

Solution to Problem

According to one advantage of the invention, there is provided a wire harness wiring structure, comprising:
a wire harness;
a first fixing member, provided at the wire harness, and configured to be fixed to a vibration transmitting source;
a second fixing member, provided at the wire harness, and configured to be fixed to a vibration non-transmitting object; and
a third fixing member, provided at the wire harness between the first fixing member and the second fixing member, configured to be fixed to a vibration non-transmitting object, and configured to allow the wire harness to move in a predetermined movement range.

The wire harness wiring structure may be configured such that: a pair of stoppers are fixed on the wire harness, and the third fixing member is arranged between the pair of stoppers.

The wire harness wiring structure may be configured such that: the wire harness includes a conductive path and a flexible outer member accommodating the conductive path, and the third fixing member and the pair of stoppers are provided on the conductive path or the flexible outer member.

The conductive path may include conductors made of aluminum or aluminum alloy.

Advantageous Effects of Invention

According to the present invention, when a vibration occurs in the wire harness, a certain degree of movement is allowed in the wire harness at the position of the third fixing member. When a vibration occurs in the wire harness, because the pair of stoppers abut with the third fixing member, large vibration of the wire harness is prevented even if the wire harness is in a state that the movement is allowed as described above.

According to the present invention, there is a structure in which the first fixing member, the second fixing member and the third fixing member are provided to the wire harness and the third fixing member is arranged between the first fixing member and the second fixing member. In the structure, the first fixing member is fixed to a vibration transmitting source, and the second fixing member and third fixing member are fixed to a vibration non-transmitting source such as a panel member which is not a vibration transmitting source. Because the third fixing member is configured to allow the wire harness to move in a predetermined movement range, an effect is achieved that even if the vibration transmitting source vibrates, and since the vibration is transmitted to the wire harness, a vibration of the wire harness occurs, a certain degree of movement of the wire harness can be allowed at the position of the third fixing member and the stress concentration at the position of the third fixing member can be alleviated. Thus, an effect is achieved that a break of the wire harness can be prevented. According to the present invention, since there are no concerns of the break, it is not necessary to perform evaluations and measures as before, and an effect is achieved that the cost can be reduced.

According to the present invention, because the pair of stoppers are fixed to the wire harness and the third fixing member is arranged between the pair of stoppers, an axial movement range of the wire harness can be prescribed. Therefore, according to the present invention, an effect is achieved that large axial vibration of the conductive path can be prevented since the pair of stoppers abut with the third fixing member. Thereby, an effect is also achieved that a contact with, for example, units around the wire harness can be prevented.

According to the present invention, the conductive path or the outer member can be an object to which the third fixing member and the pair of stoppers are preferably disposed.

According to the present invention, because a break of electric wires can be prevented in the present invention, the conductors of the conductive path constructing the wire harness can be made of aluminum or aluminum alloy, and it becomes possible to reduce the size and the weight.

DESCRIPTION OF EMBODIMENTS

In a wire harness wiring structure of the present invention, a first fixing member, a second fixing member and a third fixing member are provided to a wire harness. The third fixing member is arranged between the first fixing member and the second fixing member. While the first fixing member is fixed to a vibration transmitting source, the second fixing member and the third fixing member are fixed to a vibration non-transmitting source. The third fixing member is formed in a state that a predetermined movement range of the wire harness is ensured. In other words, the third fixing member is configured to allow the wire harness to move in a predetermined movement range.

In the wire harness wiring structure of the present invention, a pair of stoppers are fixed at a predetermined interval in an axial direction of the wire harness, and the third fixing member is arranged between the pair of stoppers.

Figure 1:
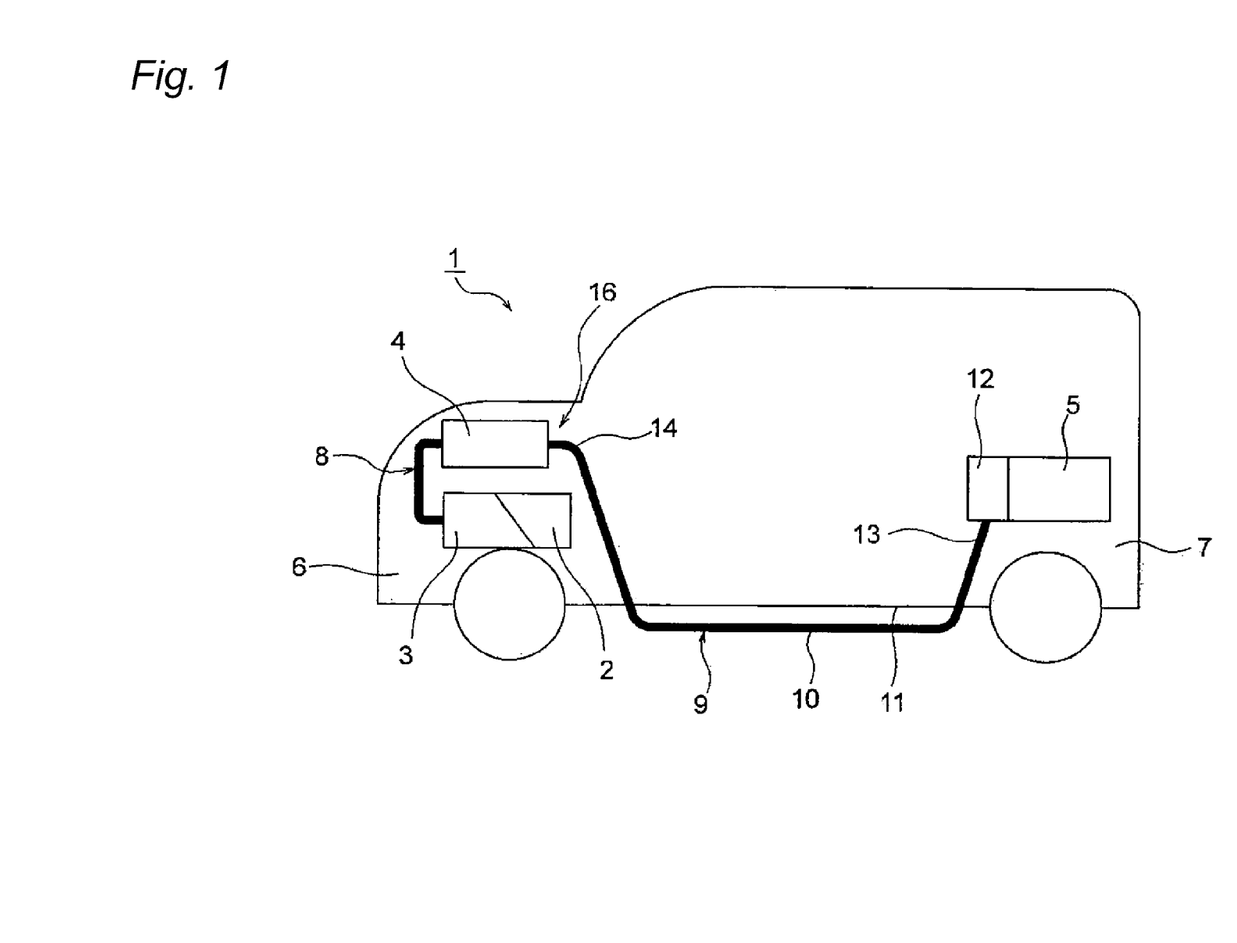
FIG. 1 is a schematic view which shows that wire harnesses are wired.
Figure 2:
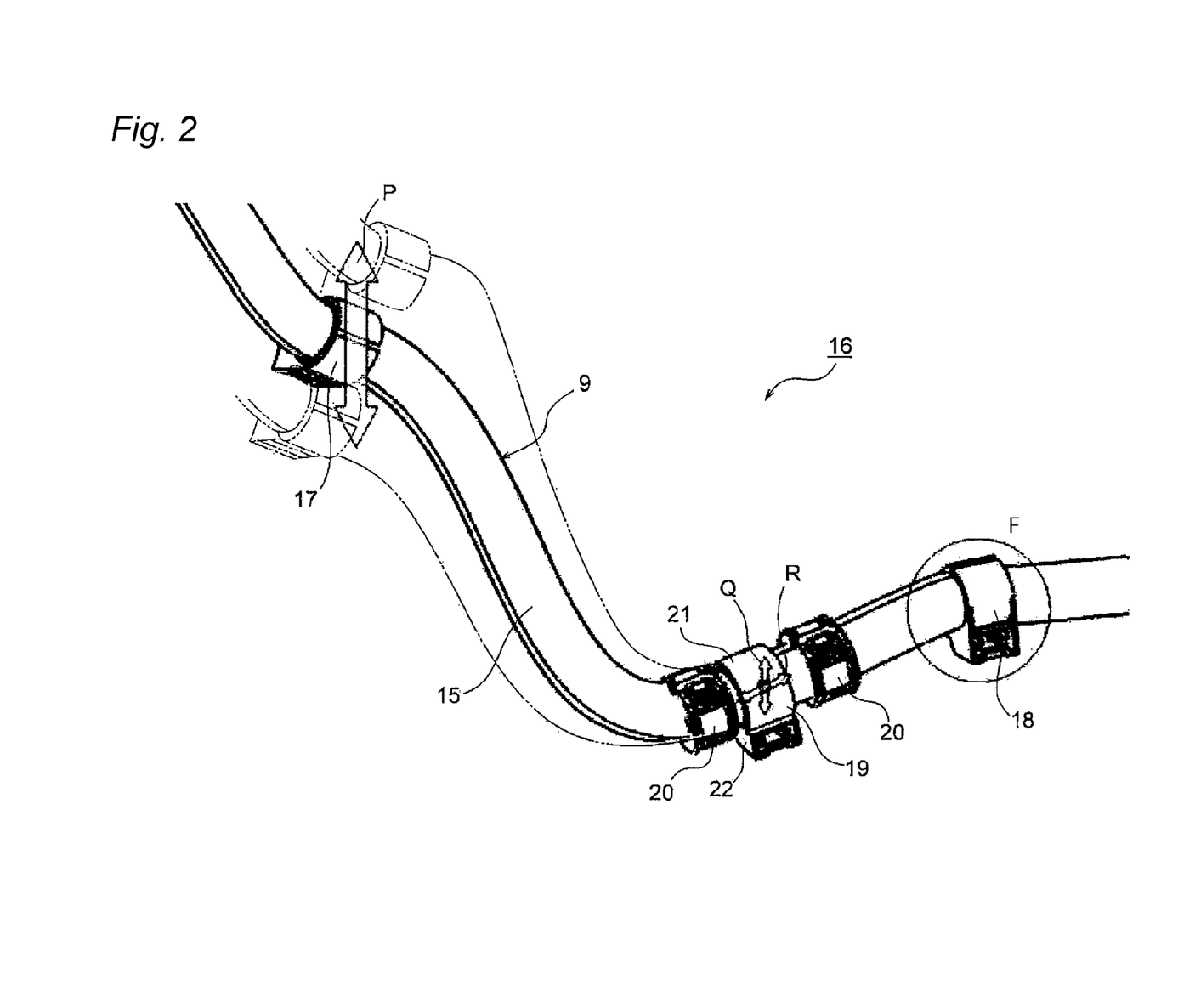
FIG. 2 is a perspective view of a wire harness wiring structure according to an embodiment of the present invention.
Figure 3A:
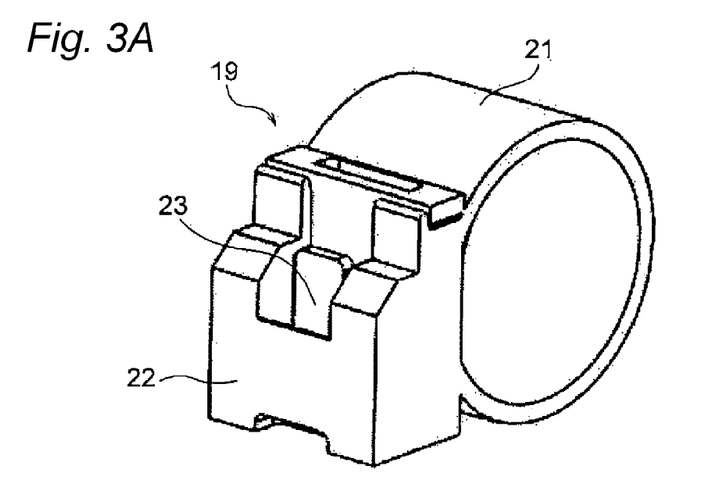
FIG. 3A is a perspective view of a third fixing member of the wire harness wiring structure.
Figure 3B:
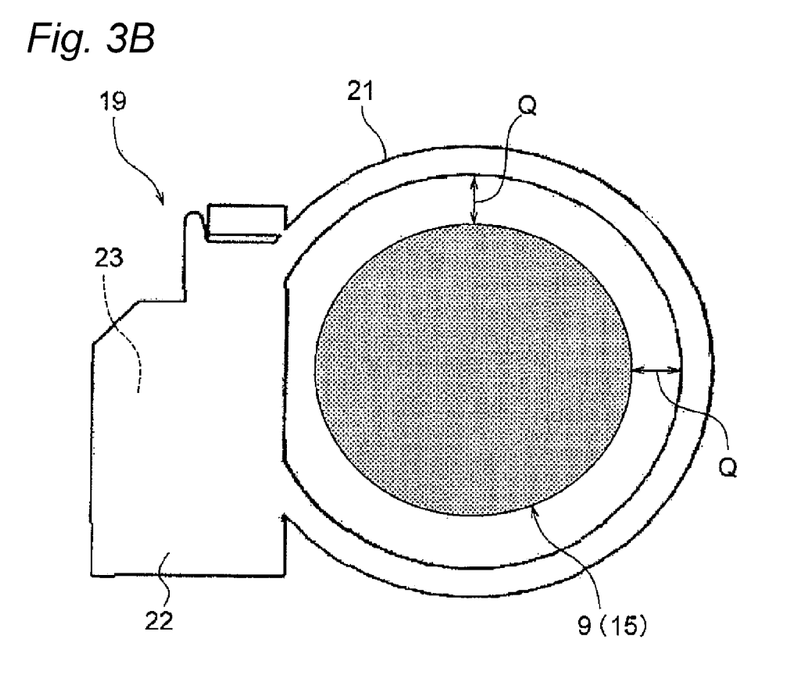
FIG. 3B is a side view of the third fixing member shown in FIG. 3A.
Figure 4:
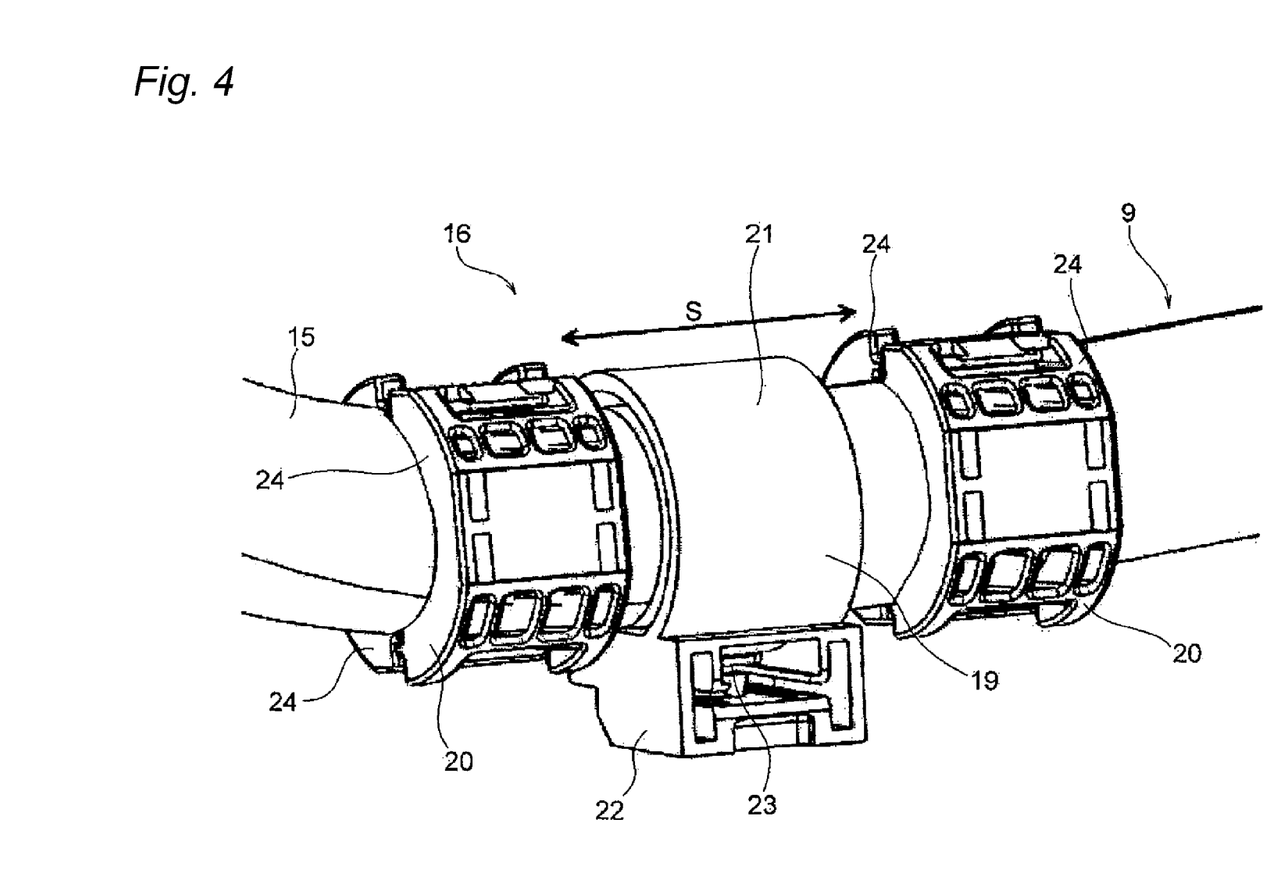
FIG. 4 is a perspective view showing a state where the third fixing member and a pair of stoppers are provided to a conductive path of a wire harness of the wire harness wiring structure.
Figure 5:
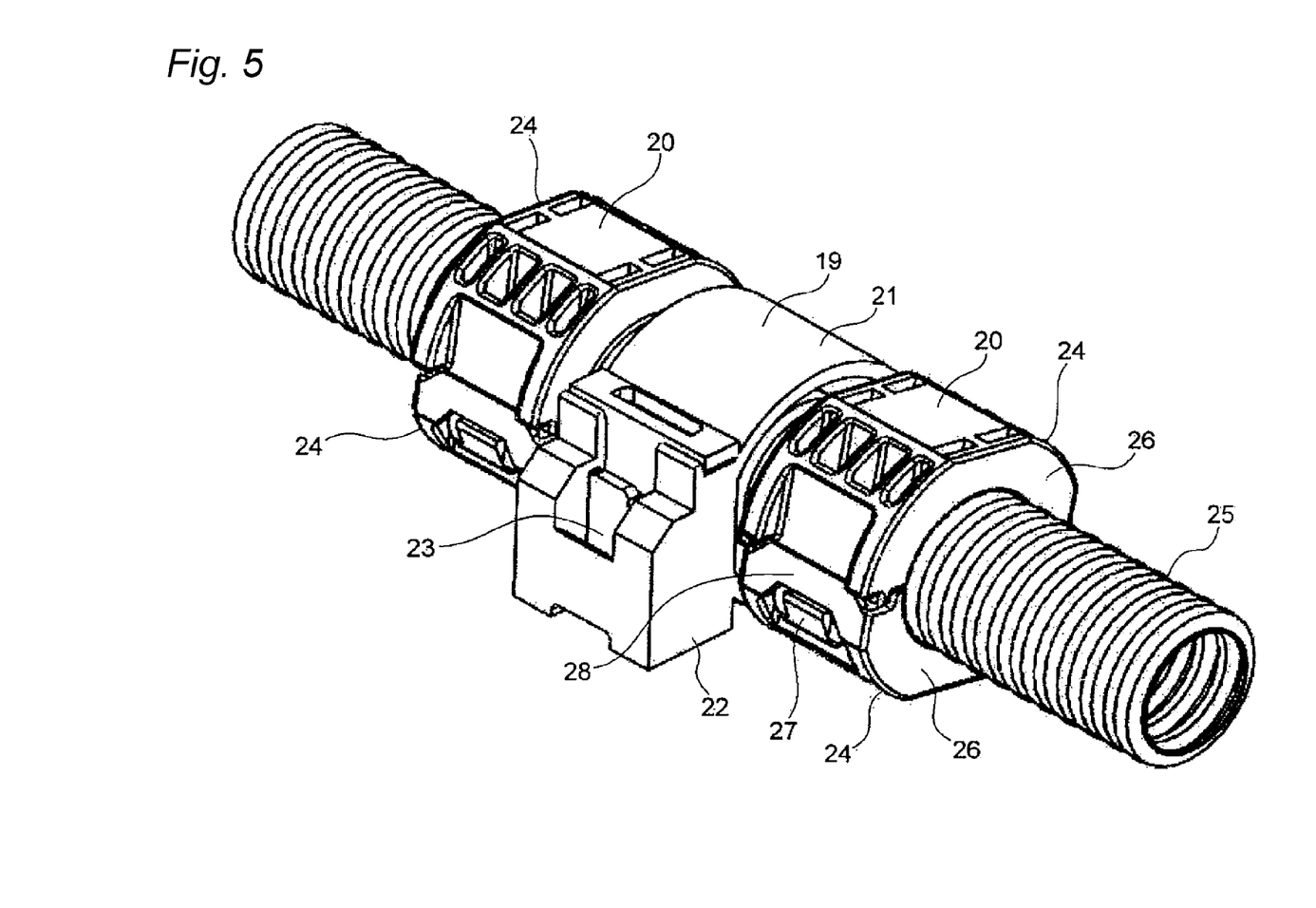
FIG. 5 is a perspective view showing a state where the third fixing member and the pair of stoppers are provided to an outer member of the wire harness of the wire harness wiring structure.
Figure 6A:
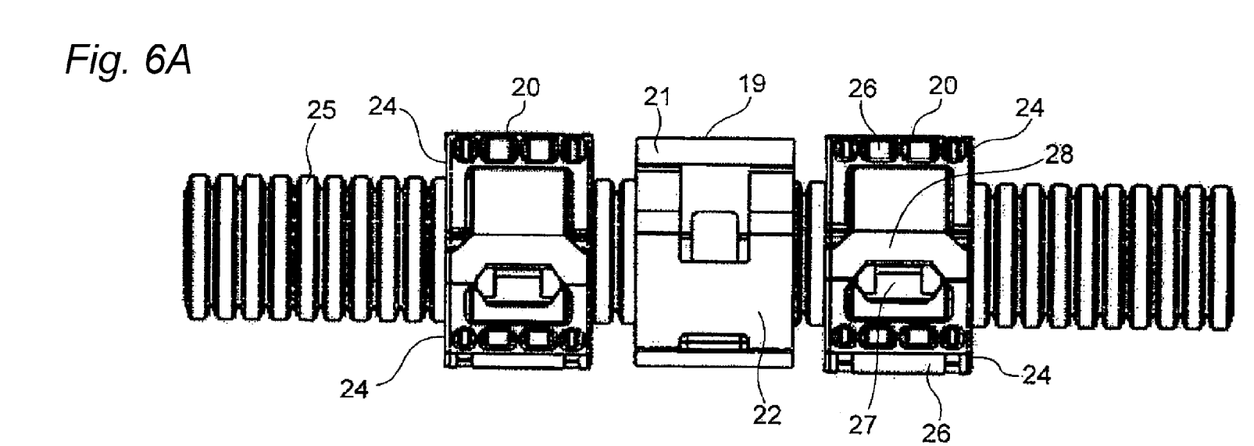
FIG. 6A is a front view of a half cut stopper of the wire harness wiring structure.
Figure 6B:
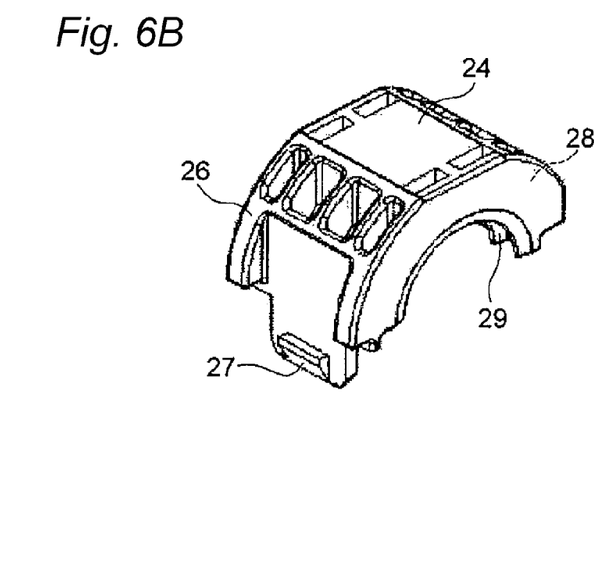
FIG. 6B is a perspective view of the half cut stopper of the wire harness wiring structure.

Below, an embodiment will be described with reference to the figures. FIG. 1 is a schematic view which shows that wire harnesses are wired. FIG. 2 is a perspective view which shows the wire harness wiring structure of the present invention. FIGS. 3A and 3B are figures of the third fixing member. FIG. 4 is a perspective view which shows that the third fixing member and the pair of stoppers are provided to a conductive path. FIG. 5 is a perspective view which shows that the third fixing member and the pair of stoppers are provided to an outer member. FIGS. 6A and 6B are a front view and a perspective view related to FIG. 5.

In the embodiment, the present invention is applied to a wire harness which is wired in a hybrid vehicle. The present invention also may be applied to a wire harness which is wired in an electric vehicle or a regular vehicle.

In FIG. 1, a reference number 1 indicates a hybrid vehicle. The hybrid vehicle 1 is a vehicle which is driven by mixing two powers from an engine 2 and a motor unit 3, and the electric power from a battery 5 will be supplied to the motor unit 3 via an inverter unit 4. The engine 2, the motor unit 3 and the inverter unit 4 are carried in an engine room 6 at the position of front wheels and the like in the embodiment. The battery 5 is carried in a vehicle rear part 7 of rear wheels and the like. It is also possible that the battery 5 is carried in a vehicle indoor room which is behind the engine room 6.

The inverter unit 4 is carried and fixed above the motor unit 3 in the embodiment. That is, the inverter unit 4 is arranged to be unified in the embodiment. The inverter unit 4 may also be provided separately. The motor unit 3 and the inverter unit 4 which are in a unified state are connected by a high voltage connecting means 8. The high voltage connecting means 8 corresponds to a high voltage wire harness which is called a motor cable, when the inverter unit 4 and the motor unit 3 are provided separately.

The battery 5 and inverter unit 4 are connected by a high voltage wire harness 9. A middle part 10 of the wire harness 9 is wired at the ground side of a vehicle body floor 11. The wire harness 9 is wired substantially in parallel with the vehicle body floor 11. The vehicle body floor 11 is a well-known body and is a so-called panel member. Through holes are formed in the vehicle body floor 11 at predetermined positions. The wire harness 9 is inserted into the through holes.

The wire harness 9 and the battery 5 are connected through a junction block 12 which the battery 5 is provided with. A rear end 13 of the wire harness 9 is electrically connected to the junction block 12 with a well-known method. A front end 14 of the wire harness 9 is electrically connected to the inverter unit 4 by a well-known method.

The motor unit 3 includes a motor and a generator in composition. The inverter unit 4 includes an inverter and a converter in composition. The motor unit 3 is formed as a motor assembly which includes a shielding case. The inverter unit 4 is also formed as an inverter assembly which includes a shielding case. The battery 5 is a Ni-MH type or a Li-ion type and is modularized. For example, an electric power storage device such as a capacitor may be used. The battery 5 is not particularly limited as long as the battery 5 may be used in the hybrid vehicle 1 or an electric vehicle.

First, the composition and the structure of the wire harness 9 are described. The wire harness 9 is a high voltage member which electrically connects the inverter unit 4 and the battery 5 as described above, and includes a conductive path 15 (refer to FIG. 2) and an outer member not shown in the figure. The middle part 10 of the wire harness 9 is wired under the vehicle body floor 11 by using clamps (not shown in the figure), and the side of the wire harness 9 at the front end 14 is wired with a wire harness wiring structure 16 of the present invention as shown in FIG. 2. The wire harness wiring structure 16 of the present invention may also be applicable to the above motor cable.

In FIG. 2, in the conductive path 15, two high voltage electric wires are adopted in the embodiment. The conductive path 15, which contains high voltage electric wires, includes conductors and an insulator (a coating), and is formed to have a length that is necessary for electrical connection. The conductors are manufactured of copper, copper alloy, aluminum or aluminum alloy. In the embodiment, aluminum or aluminum alloy, which may make the weight and the cost to be reduced, is adopted as the conductors. The conductors may be either a conductor structure in which strands are twisted or a rod-shaped conductor structure whose cross section is a rectangular shape or a round shape. For example, a conductor structure may be a rectangular single core or a round single core, and in this case, the electric wire itself becomes rod-shape. The conductive path 15 has flexibility to make it possible to vibrate. In addition, the number of the high voltage electric wires is not limited to two, therefore three or more high voltage electric wires or a single high voltage electric wire may be used as the conductive path 15.

In this embodiment, high voltage electric wires are used in the conductive path 15, but the present invention is not limited to this. That is, a high voltage coaxial combined conductive path which is constructed by coaxially combining n systems of circuits (n circuits) or the like can also be used.

The wire harness wiring structure 16 which is adopted at the side of the front end 14 of the wire harness 9 is a structure in which the conductive path 15 is wired by using a first fixing member 17, a second fixing member 18 and a third fixing member 19. It is preferred that in the structure the third fixing member 19 is arranged between a pair of stoppers 20. With such a wire harness wiring structure 16, an axial vibration of the wire harness can be prevented from becoming more violent while the stress concentration on a fixed part can be alleviated even if the conductive path 15 vibrates due to vibration or impact.

A fixing member such as a well-known clamp or a clip is used as the first fixing member 17. The first fixing member 17 whose shape or the like is not particularly limited, is fixed to a vibration transmitting source. Here, the motor unit 3 (refer to FIG. 1) is the vibration transmitting source. The vibration transmitting source positively transmits vibration to the wire harness 9. The inverter unit 4 vibrates under the influence from the motor unit 3 which is the vibration transmitting source, and the vibration is transmitted to the wire harness 9. As the vibration is transmitted, the wire harness 9 (here, the conductive path 15) vibrates as shown by an arrow P. In the fixed position of the first fixing member 17, the conductive path 15 vibrates in the same way as the inverter unit 4 and the motor unit 3.

The first fixing member 17 is attached to the conductive path 15 in a substantially close contact way, in other words, without backlash or a position gap. A well-known fixing method is adopted when the first fixing member 17 is fixed to the inverter unit 4.

A fixing member such as a well-known clamp or a clip is used as the second fixing member 18 like the first fixing member 17. The second fixing member 18 is fixed to a vibration non-transmitting source (which does not positively transmit vibration itself) not shown in the figure such as a panel member, at a fixing position shown as a circle F in FIG. 2. The second fixing member 18, like the first fixing member 17, is attached to the conductive path 15 in a substantially close contact way, in other words, without backlash or a position gap.

The third fixing member 19 is a fixing member which is disposed between the first fixing member 17 and the second fixing member 18. As same as the second fixing member 18, the third fixing member 19 is fixed to a vibration non-transmitting source not shown in the figure such as the panel member. The third fixing member 19 is arranged and fixed at a side which is closer to the second fixing member 18 than to the first fixing member 17 in the embodiment.

In FIGS. 2 to 3B, the third fixing member 19 is attached to the conductive path 15 in a state that a predetermined movement range Q is ensured, in other words, in an "oversize" state. The conductive path 15 is allowed to move within the movement range Q. A structure of the third fixing member 19 is described as follows. By the movement range Q, the conductive path 15 is allowed to move in a radial direction of the conductive path 15.

In FIG. 3, the third fixing member 19 is a resin molded article which has a harness side attached part 21 and a bracket side attached part 22 which is integrally molded with the harness side attached part 21. The harness side attached part 21 is formed in a state that the predetermined movement range Q relative to the wire harness 9 (the conductive path 15) is ensured. The harness side attached part 21 is formed into a short cylindrical shape in the embodiment. The harness side attached part 21 is formed into such a shape that the conductive path 15 can be held and guided.

The size of the movement range Q is set so that the conductive path 15 will not vibrate more than necessary. The size of the movement range Q does not need to be set to a very large size as long as the stress concentration at the position of the third fixing member 19 can be alleviated and a break in the conductive path 15 will not occur when a vibration occurs in the conductive path 15.

A taper (not shown in the figure) is formed at the opening edge of the harness side attached part 21. The taper is so formed that there will not be harmful edges damaging the wire harness 9, even if the conductive path 15 vibrates. The taper is arbitrarily set. In addition, the harness side attached part 21 may have a barrel-like shape which is slightly narrowed so that the opening at the side of the first fixing member 17 is wider, and the opening at the side of the second fixing member 18 is narrower.

The harness side attached part 21 may be formed into such a shape that the conductive path 15 is passed through in advance before the course wiring or into a shape to be attached to the conductive path 15 during the course wiring.

The bracket side attached part 22 is formed as a part which is fixed to, for example, a bracket of the panel member (not shown in the figure). If the panel member is provided with a stud bolt, the bracket side attached part 22 is formed into a shape corresponding to the stud bolt, and if the panel member is provided with a locking hole, the bracket side attached part 22 is formed into a shape to be locked by being caught into the locking hole. The bracket side attached part 22 is formed with a locking part 23 which is in a locked state when being inserted into a bracket not shown in the figure. The bracket not shown in the figure is formed into a tab shape, and has a locking hole corresponding to the locking part 23.

In FIG. 4, a pair of stoppers 20 are members which prescribe an axial movement range R (refer to FIG. 2) of the conductive path 15, and are provided at either side of the third fixing member 19 at a predetermined interval S. Large axial vibration of the conductive path 15 can be prevented since the pair of stoppers 20 abut with the third fixing member 19. If the large vibration can be prevented, the conductive path 15 can be prevented from contacting, for example, units around the conductive path 15.

The pair of stoppers 20 are formed similarly respectively. In this embodiment, the pair of stoppers 20 are formed into a short cylindrical shape. The stopper 20 is formed by engaging two half-cut stoppers 24 of the same shape with each other. The half-cut stopper 24 is described below in another example. A pair of stoppers 20 are attached to the conductive path 15 in a substantially close contact way, in other words, without backlash. The pair of stoppers 20 are attached in a state that even if the pair of stoppers 20 abut with the third fixing member 19, there is not a position gap.

In the above-described wire harness wiring structure 16, the first fixing member 17, the second fixing member 18, and the third fixing member 19 are disposed to the conductive path 15, but the present invention is not limited to this. That is, the wire harness wiring structure 16 may be disposed to an outer member 25 shown in FIGS. 5 to 6B.

In FIGS. 5 to 6B, the outer member 25 is a flexible resin member to accommodate and protect the conductive path 15 (refer to FIG. 2), and a well-known corrugated tube is adopted in the embodiment. As shown in the figure, because the corrugated tube has circular concave and convex parts, it is effective to engage the pair of stoppers 20 with the concave and convex parts. Thereby a position gap can be prevented, and the size of the movement range Q can be easily managed.

In FIGS. 6A and 6B, the stoppers 20 are formed into a shape as shown in the figure by engaging the two half-cut stoppers 24 with each other by changing the direction. The half-cut stopper 24 has a half-cut stopper body 26 which has a generally semicylindrical shape. A locking projection 27 is formed at one end of the half-cut stopper body 26, and a locking part 28 is formed at the other end. A plurality of ribs 29 are formed on the inner surface of the half-cut stopper body 26 to engage with the concave and convex parts. The locking projection 27 of the half-cut stopper body 26 is locked to the locking part 28 of a mating half-cut stopper body 26, and the locking projection 27 of the mating half-cut stopper body 26 is locked to the locking part 28 of the half-cut stopper body 26. It is effective in the reduction in cost to use the stopper 20 which is formed by engaging the half-cut stoppers 24 of the same shape with each other.

As described with reference to FIGS. 1 to 6B, the wire harness wiring structure 16 is a structure in which the first fixing member 17, the second fixing member 18 and the third fixing member 19 are provided to the wire harness 9 and the third fixing member 19 is arranged between the first fixing member 17 and the second fixing member 18. The wire harness wiring structure 16 is a structure in which the first fixing member 17 is fixed to the inverter unit 4 which is a vibration transmitting source, and the second fixing member 18 and third fixing member 19 are fixed to a vibration non-transmitting source such as a panel member which is not a vibration transmitting source. Besides, the wire harness wiring structure 16 is a structure in which the third fixing member 19 is formed in such a state that the predetermined movement range Q of the wire harness 9 is ensured.

Therefore, an effect is achieved that even if the wire harness 9 vibrates, a certain degree of movement of the wire harness 9 can be allowed at the position of the third fixing member 19 and the stress concentration at the position of the third fixing member 19 can be alleviated. Thereby, an effect is also achieved that a break of the wire harness 9 can be prevented. Since there can be no concerns of the break by adopting the wire harness wiring structure 16, it is not necessary to perform evaluations and measures as before, and an effect is achieved that the cost can be reduced.

The present invention is not restricted to the above-described embodiments, and suitable modifications, improvements and the like can be made. Moreover, the materials, shapes, dimensions, numbers, installation places, and the like of the components in the above embodiments are arbitrarily set as far as the invention can be attained, and not particularly restricted.

The present application is based on Japanese Patent Application No. 2012-121505 filed on May 29, 2012, the contents of which are incorporated herein by way of reference.

INDUSTRIAL APPLICABILITY

According to the present invention, there can be provided a wire harness wiring structure which makes it possible to prevent break of the wire harness and reduce the cost.

The invention claimed is:

1. A wire harness wiring structure, comprising:
   a wire harness;
   a first fixing member, provided at the wire harness, and configured to be fixed to a vibration transmitting source;
   a second fixing member, provided at the wire harness, and configured to be fixed to a vibration non-transmitting object;
   a third fixing member, movably provided on the wire harness between the first fixing member and the second fixing member, configured to be fixed to a vibration non-transmitting object, and configured to allow the wire harness to vibrate in a direction intersecting with an axial direction of the wire harness in a predetermined movement range when a vibration is transmitted from the vibration transmitting source;
   a first stopper fixed on the wire harness on one side of the third fixing member in the axial direction of the wire harness; and
   a second stopper fixed on the wire harness on another side of the third fixing member in the axial direction of the wire harness, wherein the first stopper and the second stopper are separately fixable on the wire harness and wherein the third fixing member is configured to be attached to the wire harness independently of the first and second stoppers.

2. The wire harness wiring structure according to claim 1, wherein
   the wire harness includes a conductive path and a flexible outer member accommodating the conductive path, and
   the third fixing member and the pair of stoppers are provided on the conductive path or the flexible outer member.

3. The wire harness wiring structure according to claim 2, wherein the conductive path includes conductors made of aluminum or aluminum alloy.

4. The wire harness wiring structure according to claim 1, wherein the vibration non-transmitting object being physically distinct from the vibration transmitting source.

5. The wire harness wiring structure according to claim 1, wherein the first fixing member is configured to be fixed to an inverter of an apparatus and the third fixing member is configured to be fixed to a component of the apparatus other than the inverter.

6. The wire harness wiring structure according to claim 1, wherein an interior surface of the third fixing member configured to face the wire harness has a corrugated shape.

7. The wire harness wiring structure according to claim 1, wherein a first opening on a first end of the third fixing member in a longitudinal direction of the wire harness is larger than a second opening on a second end of the third fixing member in the longitudinal direction of the wire harness.

8. The wire harness wiring structure according to claim 1, wherein the third fixing member further includes a mounting portion configured to be detachably fixable to one of the vibration non-transmitting object and another vibration non-transmitting object.

\* \* \* \* \*